United States Patent
Babu et al.

(10) Patent No.: US 9,243,675 B2
(45) Date of Patent: Jan. 26, 2016

(54) ROTOR BRAKE

(71) Applicant: Sikorsky Aircraft Corporation, Stratford, CT (US)

(72) Inventors: Michael Babu, Fairfield, CT (US); Yuriy Gmirya, Woodbridge, CT (US); Justin Gouveia, Monroe, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 73 days.

(21) Appl. No.: 14/066,906

(22) Filed: Oct. 30, 2013

(65) Prior Publication Data

US 2015/0114772 A1 Apr. 30, 2015

(51) Int. Cl.
 *F16D 65/12* (2006.01)
 *B64C 11/00* (2006.01)
 *B60T 1/06* (2006.01)

(52) U.S. Cl.
 CPC .............. *F16D 65/123* (2013.01); *B60T 1/062* (2013.01); *B64C 11/002* (2013.01); *F16D 65/125* (2013.01)

(58) Field of Classification Search
 CPC ..... F16D 65/128; F16D 65/12; F16D 65/123; F16D 2065/1316; F16D 2065/1328; F16D 2065/1392; F16D 2065/1396; F16D 2065/1368; F16D 2065/1384; F16D 2202/0039; B60B 27/0052; B64C 27/12; B64C 27/14; B64C 27/025; B64D 35/04; B64D 35/06

USPC ..................... 188/218 XL, 250 G, 71.4–71.5; 244/17.11, 111

See application file for complete search history.

(56) References Cited

U.S. PATENT DOCUMENTS

| | | | |
|---|---|---|---|
| 3,776,368 A | 12/1973 | Brauss | |
| 5,000,056 A | 3/1991 | Crawford et al. | |
| 2004/0124048 A1 * | 7/2004 | Sandberg | F16D 55/40 188/218 XL |
| 2005/0205368 A1 * | 9/2005 | Gripemark | F16D 55/36 188/218 XL |
| 2012/0073917 A1 * | 3/2012 | Lee | F16D 65/12 188/218 XL |

* cited by examiner

*Primary Examiner* — Anna Momper
*Assistant Examiner* — San Aung
(74) *Attorney, Agent, or Firm* — Cantor Colburn LLP

(57) ABSTRACT

A brake disc of a rotor brake is provided including a generally cylindrical body having a first planar surface, a second, opposite planar surface, and a central opening extending there through. A plurality of first connection members extend generally outwardly from the first planar surface. The first connection members are generally equidistantly spaced about a diameter of the first planar surface. A plurality of second connection members extend generally outwardly from the second planar surface. The second connection members are generally equidistantly spaced about a diameter of the second planar surface.

20 Claims, 6 Drawing Sheets

ROTOR BRAKE

BACKGROUND OF THE INVENTION

Exemplary embodiments of the invention generally relate to a rotary wing aircraft, and more particularly, to a brake assembly configured to stop the rotation of a rotor shaft of a rotary wing aircraft.

A conventional disc brake assembly for the rotor of a rotary wing aircraft includes a steel disc which is coupled to a rotating component of the drive system, such as a flange of a shaft for example, using a plurality of bolts such that the disc rotates in unison with the rotor shaft. A brake caliper is mounted to the transmission housing and is positioned adjacent each side of the disc rotor. The brake caliper holds disc brake friction material pads in a position relative to the disc such that the pads can be applied to each side of the disc rotor. The brake caliper is hydraulically actuated from an assembly which displaces brake fluid through a brake line to the caliper. The brake fluid is introduced into the caliper under high pressure causing one or more movable pistons to force the pads into contact with the disc thereby stopping the drive system and thus the main rotor.

During activation of the rotor brake system, the torque created by the rotor system passes through the rotating component, the bolts, the disc, and the caliper assembly. The thru holes used to couple the disc to the rotating component create very high stress concentrations in the disc, therefore limiting the design to materials with high yield stress allowables, such as steel. Steel, however, is not a preferred material due to weight, susceptibility to distortion from thermal cycles, and corrosive properties. When the caliper is engaged, the high friction pads contact the disc surface creating thermal cycles which distort the disc. If the disc becomes distorted, the contact surface area between the pads and disc decreases, making the system less efficient. Furthermore, a layer of surface corrosion may result on a steel disc due to normal exposure to the environment. When the brake engages, the top layer of corroded material is removed, providing no benefit in stopping the drive system, and ultimately causing the disc to wear quicker. As a result of these factors, the steel disc has a smaller reliability factor, reduces fatigue life of the brake assembly, and is more susceptible to damage and failure.

BRIEF DESCRIPTION OF THE INVENTION

According to one embodiment of the invention, a brake disc of a rotor brake is provided including a generally cylindrical body having a first planar surface, a second, opposite planar surface, and a central opening extending there through. A plurality of first connection members extend generally outwardly from the first planar surface. The first connection members are generally equidistantly spaced about a diameter of the first planar surface. A plurality of second connection members extend generally outwardly from the second planar surface. The second connection members are generally equidistantly spaced about a diameter of the second planar surface.

According to another embodiment of the invention, an assembly for mounting a brake disc to a rotating component is provided including a generally cylindrical brake disc. The brake disc has a first planar surface, a second, opposite planar surface, and a central opening extending there through. A plurality of first connection members extend generally outwardly from the first planar surface. The first connection members are generally equidistantly spaced about a diameter of the first planar surface. A plurality of second connection members extend generally outwardly from the second planar surface. The second connection members are generally equidistantly spaced about a diameter of the second planar surface. The assembly also includes a generally hollow cylindrical shaft and a generally hollow sleeve configured to receive a portion of the shaft. The shaft includes a first braking flange having a plurality of third connection members configured to engage the plurality of first connection members. The sleeve includes a second braking flange including a plurality of fourth connection members configured to engage the plurality of second connection members.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
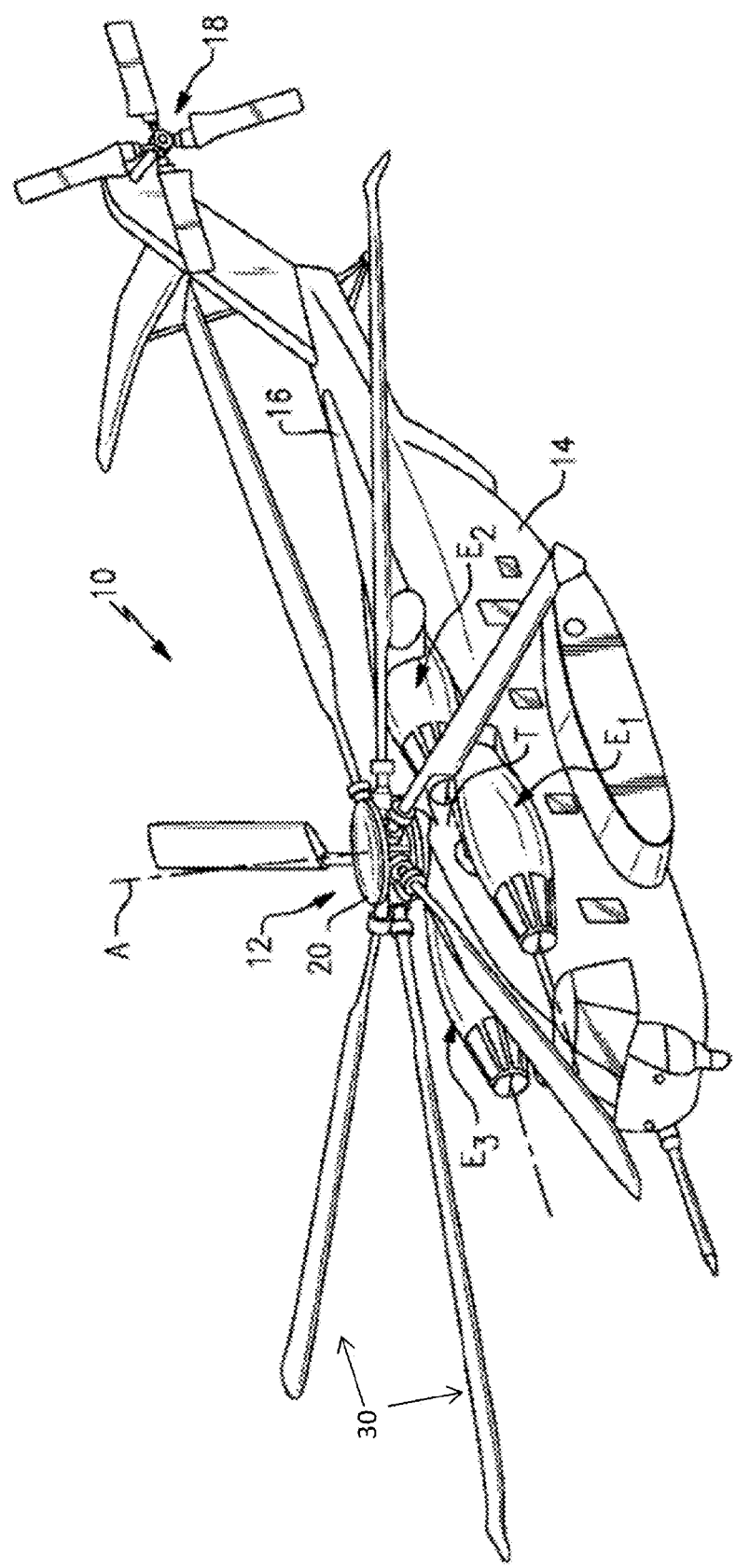
FIG. 1 is a perspective view of an example of a rotary wing aircraft.
Figure 2:
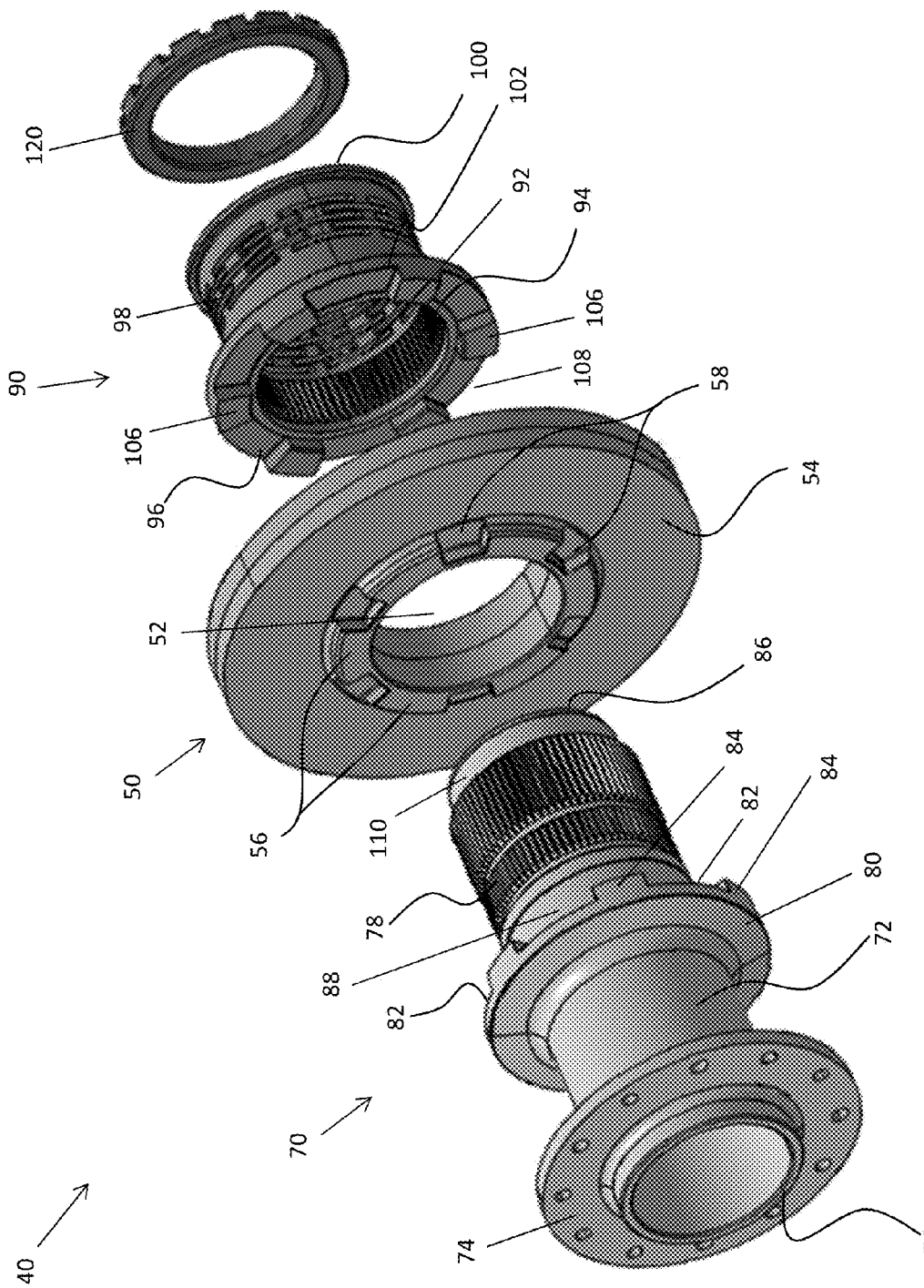
FIG. 2 is an exploded perspective view of an assembly for mounting a brake disc to a rotating component according to an embodiment of the invention.
Figure 3:
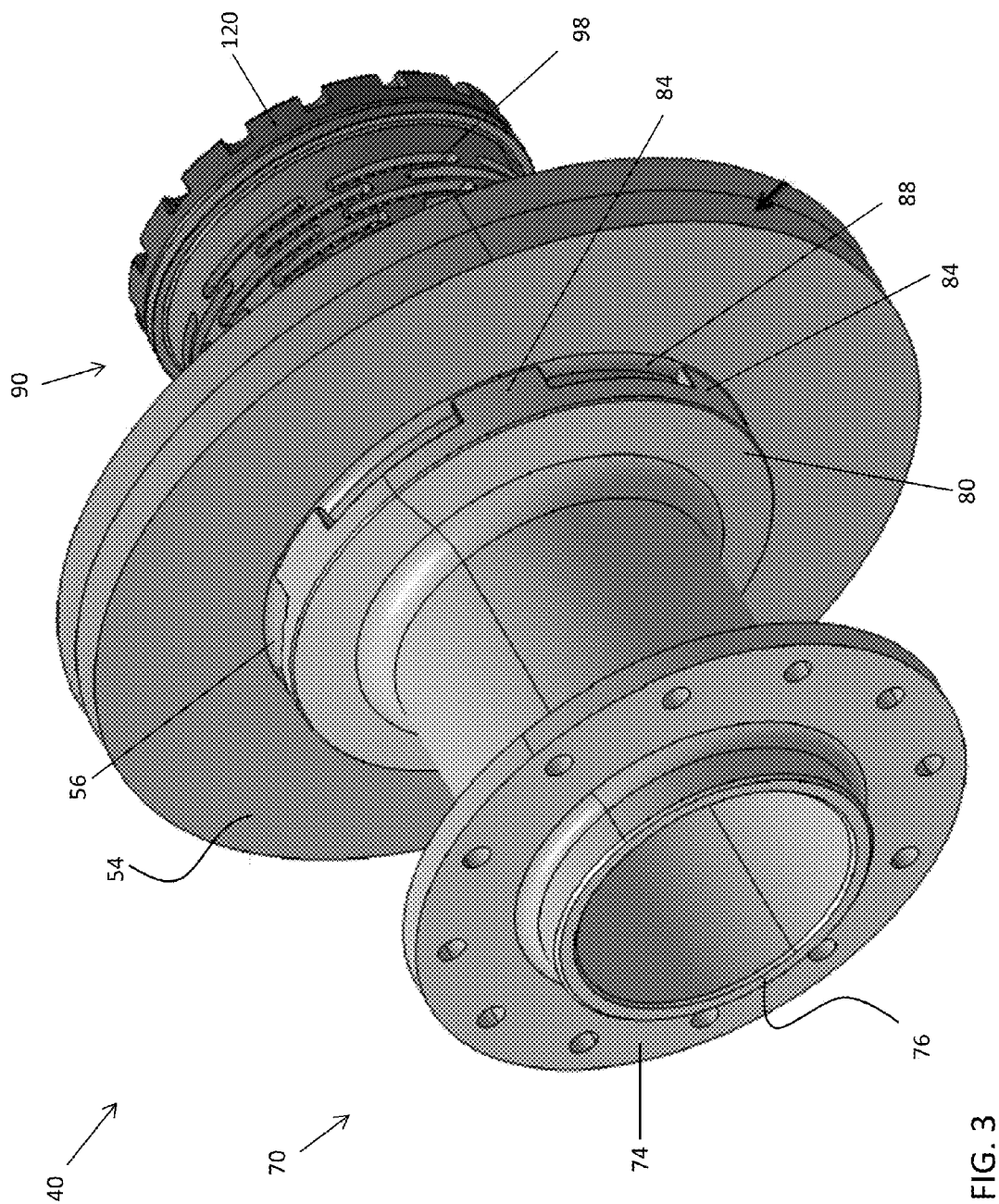
FIG. 3 is a perspective view of an assembly for mounting a brake disc to a rotating component according to an embodiment of the invention.
Figure 4:
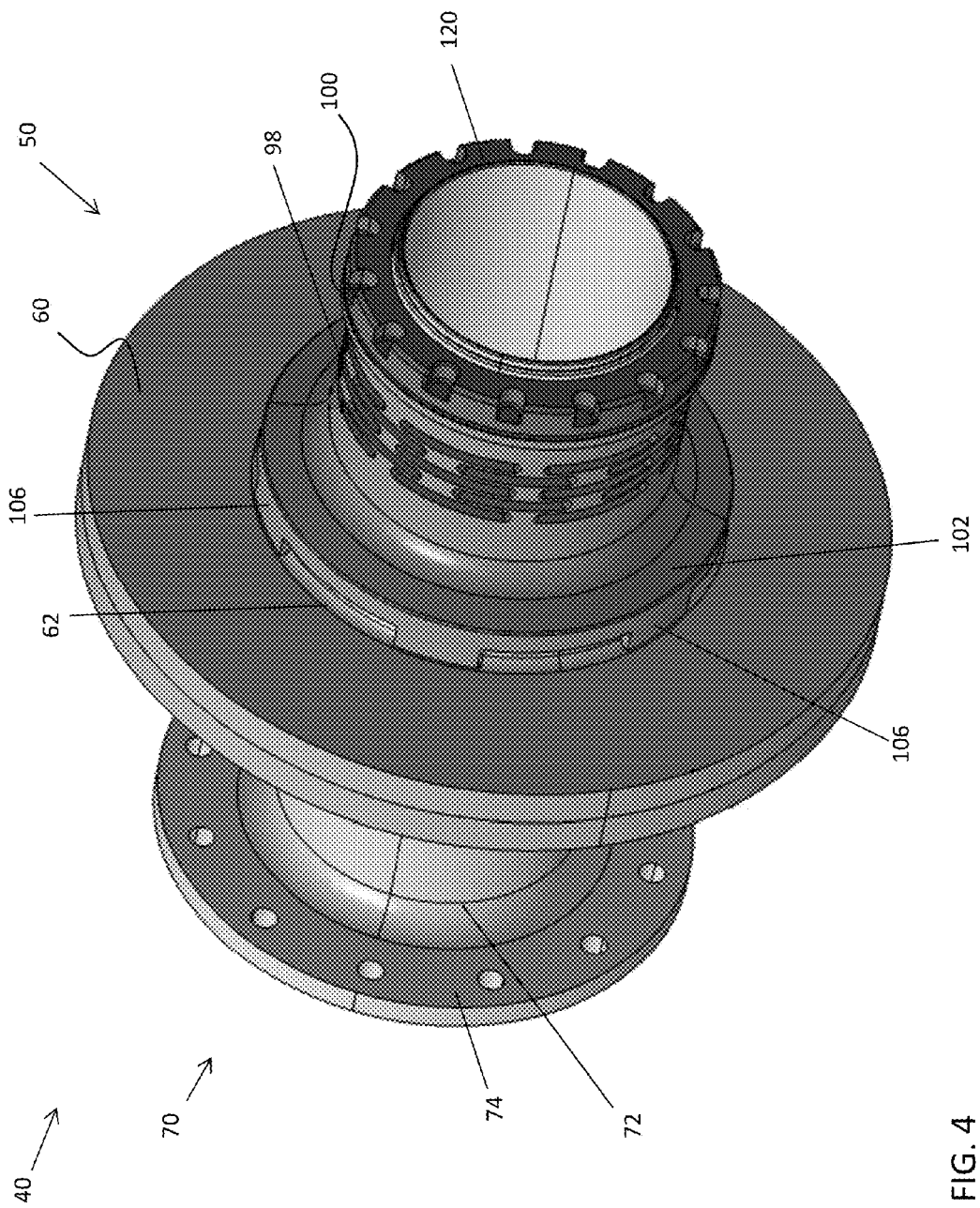
FIG. 4 is an alternate perspective view of an assembly for mounting a brake disc to a rotating component according to an embodiment of the invention.
Figure 5:
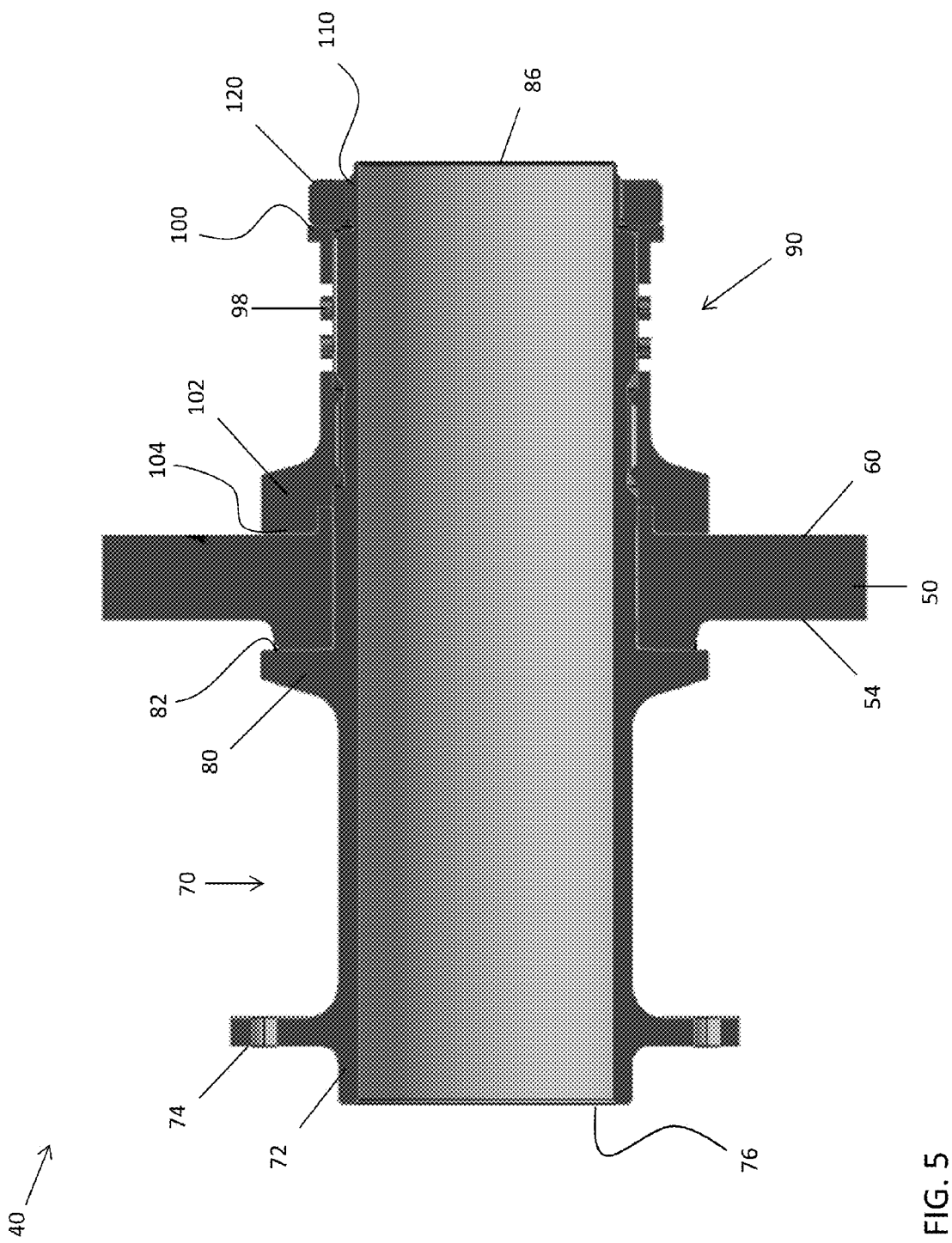
FIG. 5 is a cross-section of an assembly for mounting a brake disc to a rotating component according to an embodiment of the invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation A through a transmission including main gearbox (illustrated schematically at T) by one or more engines E. The main rotor system 12 includes multiple rotor blade assemblies 30 mounted to a rotor hub 20. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Referring now to FIGS. 2-5, an assembly 40 for mounting a braking disc 50 to a rotating component of a rotary wing aircraft 10 is provided in more detail. Although assembly 40 is illustrated and described in the disclosed non-limiting embodiment with reference to a rotary wing aircraft, other configurations or applications including rotor systems, such as a wind turbine or automotive brake for example, are within the scope of the invention.

A braking disc 50 of the assembly 40, configured for use with one or more calipers (not shown) is generally cylindrical and includes a central opening 52. In one embodiment, the braking disc 50 is made from a carbon fiber material. Extending generally outwardly from a first planar surface 54 of the braking disc 50 is at least one first connection member 56. In one embodiment, the disc 50 includes a plurality of first connection members 56, spaced about the diameter of the planar surface 54. The plurality of first connection members 56 may be substantially similar, or alternatively, different in size and/or shape. Adjacent first connection members 56 are separated by a plurality of first openings 58. The plurality of first connection members 56 may be equidistantly spaced such that each of the plurality of first openings 58 is generally identical. While described as being made of a carbon fiber material, it is understood that the braking disc 50 could be made of other materials, such as ceramic materials in addition to or instead of the carbon fiber material.

Extending generally outwardly from a second planar surface 60 of the braking disc 50 is at least one second connection member 62. In one embodiment, the disc 50 includes a plurality of second connection members 62 spaced about the diameter of the planar surface 60. The plurality of second connection members 62 may be substantially similar, or alternatively, different in size and/or shape. Adjacent second connection members 62 are separated by a plurality of second openings 64. The plurality of second connection members 62 may be equidistantly spaced such that each of the plurality of second openings 64 is generally identical. The number of second connection members 62 may equal or differ from the number of first connection members 56. In addition, the plurality of first connection members 56 and the plurality of second connection members 62 may be substantially identical or different in size and/or shape.

A shaft 70 configured to support the braking disc 50 includes a generally hollow cylindrical tube 72. A first flange 74, arranged at a first end 76 of the shaft 70, is configured to couple the shaft 70 to another component, such as a shaft (not shown) for example, in the transmission T. Disposed about a portion of the outer diameter of the shaft 50 is a plurality of outwardly extending, substantially similar splines 78.

A first braking flange 80 is integrally formed with the outer diameter of the shaft 70 at a position between the first flange 74 and the plurality of splines 78. In one embodiment, a distance exists between the first braking flange 80 and the splines 78 such that the braking disc 50 may be received on the shaft 70 there between. The first braking flange 80 includes at least one third connection member 84 extending from a planar surface 82 of the flange 80 in the direction of the second end 86 of the shaft 70. In one embodiment, the first braking flange 80 includes a plurality of third connection members 84 spaced generally equally about the diameter of the planar surface 82 such that a plurality of third openings 88 exists between adjacent third connection members 84. The plurality of third connection members 84 may be substantially similar in size and/or shape, or alternatively, may be different. In one embodiment, the plurality of third connection members 84 is substantially similar in shape and/or size to the plurality of first openings 58 of the braking disc 50. Similarly, the plurality of third openings 88 may be substantially similar in shape and/or size to the plurality of first connection members 56 extending from the first planar surface 54 of the braking disc 50.

The second end 86 of the shaft 70 is configured to be received within a hollow interior 92 of a generally cylindrical sleeve 90. The inner diameter of the sleeve 90 is generally equal to the outer diameter of the shaft 70. A plurality of inwardly extending and substantially similar splines 94 are formed about the inner circumference of the sleeve 90 adjacent a first end 96. The plurality of splines 96 on the sleeve 90 is complementary to the plurality of splines 78 on the shaft 70 such that the pluralities of splines 78, 96 are configured to engage one another to couple the shaft 70 and the sleeve 90. A portion 98 of the sleeve 90 adjacent a second end 100 is configured to absorb an axial load or force applied to the sleeve 90. In one embodiment, the portion 98 of the sleeve 90 includes a calibrated machine spring to maintain preload on disc 50.

Similar to the shaft 70, a second braking flange 102 is integrally formed with a first end 96 of the sleeve 90. The second braking flange 102 includes at least one fourth connection member 106 extending from the planar surface 104 of the flange 102 in the direction of the shaft 70. In one embodiment, the second braking flange 102 includes a plurality of fourth connection members 106 spaced at generally equal intervals about the diameter of the planar surface 104 such that a plurality of fourth openings 108 exists between adjacent fourth connection members 106. The plurality of fourth connection members 106 may be substantially similar in size and/or shape, or alternatively, may be different. In one embodiment, the plurality of fourth connection members 106 are substantially similar in shape and/or size to the plurality of second openings 64 of the braking disc 50. Similarly, the plurality of fourth openings 108 may be substantially similar in shape and/or size to the plurality of second connection members 62 extending from the second planar surface 60 of the braking disc 50.

When assembled, the braking disc 50 is positioned along the shaft 70, between the first braking flange 80 and the plurality of splines 78. Each of the plurality of first connection members 56 is generally received within one of the plurality of third openings 88 and each of the plurality of third connection members 84 is generally received within one of the plurality of first openings 58. However, the first planar surface 54 of the braking disc 50 is separated from the ends 85 of the third connection members 84 by a first distance.

The sleeve 90 is installed by aligning the plurality of fourth connection members 106 with the plurality of second openings 64 and by aligning the plurality of second connection members 62 with the plurality of fourth openings 108. The second end 86 of the shaft 70 is inserted into the sleeve 90 such that the splines 96 of the sleeve 90 engage the splines 78 of the shaft 70. Once the splines 78, 96 engage, each of the plurality of fourth connection members 106 is positioned within one of the plurality of second openings 64 and the each of the plurality of second connection members 62 is disposed within one of the plurality of fourth openings 108. Similar to the first braking flange 80, the ends 107 of the plurality of fourth connection members 106 are separated from the second planar surface 60 of the braking disc 50 by a second distance. The first and second distance may be generally the same, or alternatively, may be different. The first and second distance allow for thermal expansion of the disc 50 and flanges 80, 102 as a result of heat generated when a caliper (not shown) is applied thereto, as well as allowing materials with different thermal expansion rates used in the disc 50 and flanges 80, 102 to interface.

When assembled, the second end 86 of the shaft 70 extends beyond the second end 100 of the sleeve 90. The exposed portion 110 of the shaft 70 has an outer diameter generally smaller than the remainder of the shaft 70. A nut 120 is received about the outer diameter of the exposed portion 110. In one embodiment, the outer diameter of the exposed portion 110 of the shaft 70 includes a plurality of threads (not shown)

complementary to the plurality of threads on the nut 120. When coupled to the shaft 50, the nut 120 retains the sleeve 90 in a desired position relative to the shaft 70. By torquing the nut 120 until the nut 120 contacts the second end 100 of the sleeve 90, a preload is generated in portion 98 of the sleeve 90.

Figure 6:
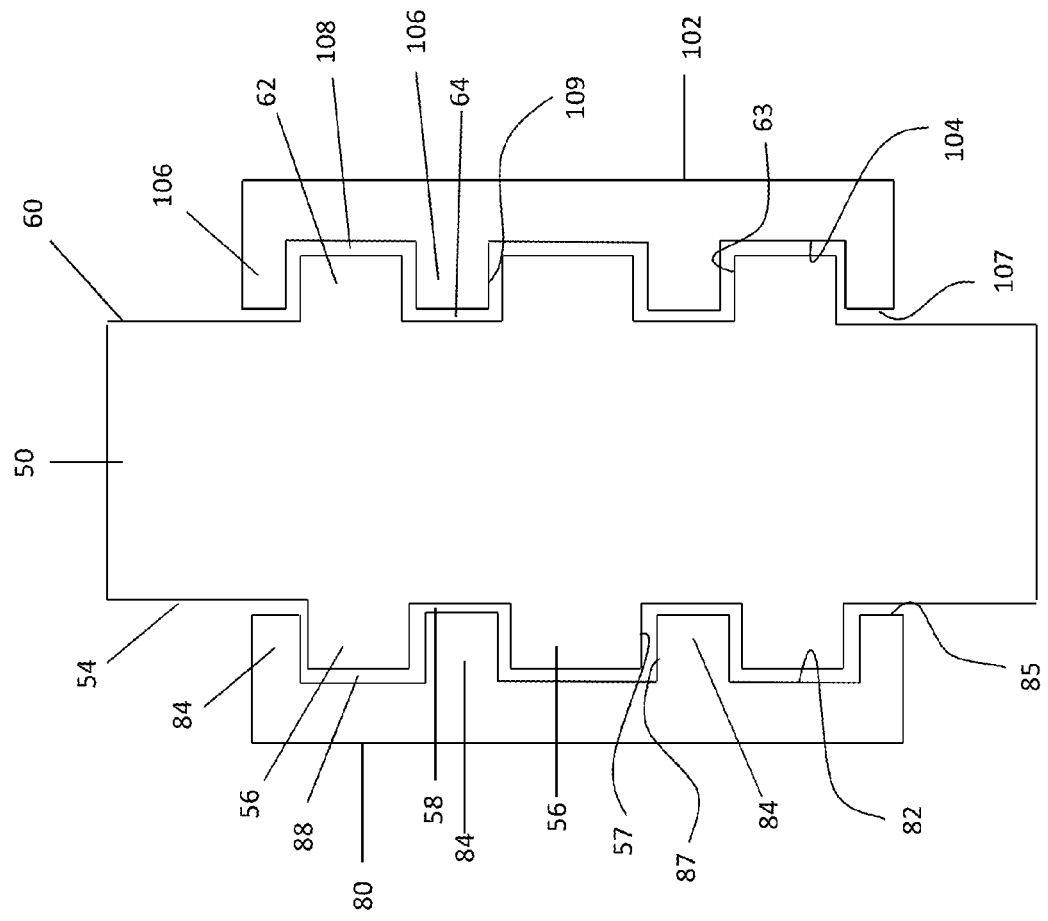
FIG. 6 is a top view of a portion of an assembly for mounting a brake disc to a rotating component according to an embodiment of the invention.

Referring now to FIG. 6, a top view of a portion of the assembly 40 is illustrated. As the assembly 40 rotates, a first edge 57 of each of the plurality of first connection members 56 engages an adjacent first edge 87 of each of the plurality of third connection members 84. Similarly, a first edge 63 of each of the plurality of second connection members 62 contacts a first edge 109 of each of the plurality of fourth connection members 106. These connections formed on both sides of the braking disc 90 impart the rotational force of the shaft 70 and sleeve 90 to the braking disc 50. The arc length of each of the plurality of first connection members 56, second connection members 62, third connection members 84, and fourth connection members 106, may be designed to optimize the shear stress on the brake disc 50 during rotation.

By eliminating the bolts, and therefore the stress concentrations of the disc associated therewith, the disc 50 can withstand higher burst pressure and can rotate at faster speeds. In addition, the disc 50 may also be manufactured from a lighter material, such as carbon fiber, which decreases maintenance, eliminating corrosion and distortion due to thermal cycles, while increasing reliability of the system. Use of the shaft 70 and sleeve 90 to mount the brake disc 50 to a rotating component shares the torque applied to the disc 50. The disc 50 can move both radially and axially without experiencing any thermal stress. In addition, the simplicity of the assembly 40 ensures that that shaft 70, disc 50, sleeve 90 and nut 120 are installed correctly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A brake disc of a rotor brake comprising:
   a generally cylindrical body having a first planar surface, a second, opposite planar surface, and a central opening extending there through;
   a plurality of first connection members extending generally outwardly from the first planar surface, the first connection members being generally equidistantly spaced about a diameter of the first planar surface; and
   a plurality of second connection members extending generally outwardly from the second planar surface, the second connection members being generally equidistantly spaced about a diameter of the second planar surface;
   wherein at least one of the plurality of first connection members and second connection members are substantially similar in size and/or shape.

2. The brake disc according to claim 1, wherein the cylindrical body comprises a carbon fiber.

3. The brake disc according to claim 1, wherein the plurality of first connection members are generally equidistantly radially spaced about the central opening.

4. The brake disc according to claim 1, wherein the plurality of first connection members are configured to engage a portion of a first component of an assembly passing through the central opening, and the plurality of second connection members are configured to engage a portion of a second component of the assembly passing through the central opening.

5. The brake disc according to claim 4, wherein the first component and the second component are configured to apply a torque from the assembly to the brake disc.

6. The brake disc according to claim 1, wherein a plurality of first openings is generally formed between adjacent first connection members and a plurality of second openings is generally formed between adjacent second connection members.

7. The brake disc according to claim 6, wherein the plurality of first connection members is substantially similar and generally equidistantly spaced such that each of the plurality of first openings is generally identical.

8. The brake disc according to claim 6, wherein the plurality of second connection members is substantially similar and generally equidistantly spaced such that each of the plurality of second openings is generally identical.

9. An assembly for mounting a brake disc to a rotating component, comprising:
   a generally cylindrical brake disc including:
      a first planar surface, a second, opposite planar surface, and a central opening extending there through;
      a plurality of first connection members extending generally outwardly from the first planar surface, the first connection members being generally equidistantly spaced about a diameter of the first planar surface; and
      a plurality of second connection members extending generally outwardly from the second planar surface, the second connection members being generally equidistantly spaced about a diameter of the second planar surface;
   a generally hollow cylindrical shaft having a first braking flange, the first braking flange including a plurality of third connection members configured to engage the plurality of first connection members; and
   a generally hollow sleeve configured to receive a portion of the shaft, the sleeve having a second braking flange including a plurality of fourth connection members configured to engage the plurality of second connection members.

10. The assembly according to claim 9, wherein a plurality of first openings is generally formed between adjacent first connection members, a plurality of second openings is generally formed between adjacent second connection members, a plurality of third openings is formed between adjacent third connection members, and a plurality of fourth openings is formed between adjacent fourth connection members.

11. The assembly according to claim 10, wherein each of the plurality of first connection members is generally received within one of the plurality of third openings, and each of the plurality of third connection members is generally received within one of the plurality of first openings.

12. The assembly according to claim 11, wherein a distance exists between the first planar surface of the brake disc and an end of each of the plurality of third connection members.

13. The assembly according to claim 10, wherein each of the plurality of second connection members is generally received within one of the plurality of fourth openings, and each of the plurality of fourth connection members is generally received within one of the plurality of second openings.

14. The assembly according to claim 13, wherein a distance exists between the second planar surface of the brake disc and an end of each of the plurality of fourth connection members.

15. The assembly according to claim 9, wherein the shaft includes a plurality of outwardly extending first splines and the sleeve includes a plurality of inwardly extending second splines, wherein the plurality of first splines and the plurality of second splines are configured to engage to couple to shaft and the sleeve.

16. The assembly according to claim 9, wherein a portion of the sleeve is configured to absorb an axial load.

17. The assembly according to claim 16, further comprising a nut configured to mount to an end of the shaft extending beyond the sleeve.

18. The assembly according to claim 17, wherein the nut abuts an end of the sleeve such that a preload is generated in the portion of the sleeve configured to absorb an axial load.

19. The assembly according to claim 9, wherein the disc is configured to move axially and radially relative to the sleeve and shaft.

20. A brake disc of a rotor brake comprising:
a generally cylindrical body having a first planar surface, a second, opposite planar surface, and a central opening extending there through;
a plurality of first connection members extending generally outwardly from the first planar surface, the first connection members being generally equidistantly spaced about a diameter of the first planar surface, wherein the plurality of first connection members are configured to engage a portion of a first component of an assembly passing through the central opening; and
a plurality of second connection members extending generally outwardly from the second planar surface, the second connection members being generally equidistantly spaced about a diameter of the second planar surface, wherein the plurality of second connection members are configured to engage a portion of a second component of the assembly passing through the central opening.

* * * * *